（12） United States Patent
Kindstrand

(10) Patent No.: US 12,552,993 B2
(45) Date of Patent: Feb. 17, 2026

(54) PURIFICATION OF TAR CONTAINING GAS STREAMS

(71) Applicant: Meva Energy AB, Hisings Backa (SE)

(72) Inventor: Mattias Kindstrand, Sävedalen (SE)

(73) Assignee: Meva Energy AB, Hisings Backa (SE)

( * ) Notice: Subject to any disclaimer, the term of this patent is extended or adjusted under 35 U.S.C. 154(b) by 192 days.

(21) Appl. No.: 18/421,706

(22) Filed: Jan. 24, 2024

(65) Prior Publication Data

US 2024/0254396 A1 Aug. 1, 2024

(30) Foreign Application Priority Data

Jan. 31, 2023 (EP) .................................. 23154314

(51) Int. Cl.
*C10C 1/18* (2006.01)
*B01D 11/04* (2006.01)
*B01D 47/00* (2006.01)

(52) U.S. Cl.
CPC ............ *C10C 1/18* (2013.01); *B01D 11/0488* (2013.01); *B01D 11/0492* (2013.01); *B01D 47/00* (2013.01)

(58) Field of Classification Search
CPC ............ B01D 11/0488; B01D 11/0492; B01D 47/00; C02F 1/26; C02F 1/385; C02F 2101/32; C02F 2103/18; C02F 2301/046; C10C 1/18; C10K 1/046; C10K 1/06; C10K 1/08; C10K 1/085; C10K 1/101; C10K 1/18
See application file for complete search history.

(56) References Cited

U.S. PATENT DOCUMENTS

| 4,154,584 A | 5/1979 | Ullrich |
| 2012/0167452 A1 | 7/2012 | Platon et al. |
| 2012/0313378 A1* | 12/2012 | DePuy .................... C10K 1/101 290/1 A |
| 2015/0136696 A1 | 5/2015 | Bedard et al. |

FOREIGN PATENT DOCUMENTS

GB 2501261 A 10/2013

OTHER PUBLICATIONS

European Search Report for EP23154314.1 that is the parent application to the instant application; dated Jul. 25, 2023; 9 pages.

* cited by examiner

*Primary Examiner* — Ellen M Mcavoy
*Assistant Examiner* — Chantel Graham
(74) *Attorney, Agent, or Firm* — Harness, Dickey & Pierce, P.L.C.; Anthony G. Fussner

(57) ABSTRACT

The present invention relates to a method for purifying a tar containing gas stream. The method comprises the steps of:
  a) contacting a tar containing gas stream with a washing liquid in a washing unit to obtain a tar containing washing liquid and a purified gas stream;
  b) adding an extractant to the tar containing washing liquid to obtain an extraction liquid comprising a tar containing extractant and a regenerated washing liquid;
  c) cooling the extraction liquid;
  d) after cooling, separating the tar containing extractant from the regenerated washing liquid, and
  e) recirculating the regenerated washing liquid to the washing unit.

20 Claims, 3 Drawing Sheets

PURIFICATION OF TAR CONTAINING GAS STREAMS

CROSS-REFERENCE TO RELATED APPLICATION

This application claims European Patent Application No. 23154314.1 filed Jan. 31, 2023 which is incorporated herein by reference in its entirety.

FIELD OF THE INVENTION

The present disclosure relates to a method and a system for purifying a tar containing gas stream.

BACKGROUND

Gasification can be described as a process where organic or fossil fuel based carbonaceous materials are converted into a product gas of varying molecular compounds, such as carbon monoxide, hydrogen, and carbon dioxide. This is generally achieved through a thermo-chemical reaction where the carbonaceous materials react with a controlled amount of oxygen, steam and/or carbon dioxide acting as an oxidant. The resulting product gas mixture is often called synthesis gas (also known as synthetic gas or syngas).

The synthesis gas can later be used as a fuel gas where it is burned directly as fuel to produce heat and/or electric power or as an intermediate for other multiple uses. The power derived from gasification of bio-based feedstock is considered to be a source of renewable energy and the gasification industry has attracted a lot of interest during these last decades.

Gasification differs from other, more traditional energy-generating processes, in that it is not a combustion process, but rather a conversion process. Instead of the carbonaceous feedstock being wholly burned in air to create heat to raise steam, which is used to drive turbines, the feedstock to be converted into gas is incompletely combusted to create the syngas which then at a later stage is completely combusted in order to release the remaining energy. The atmosphere within the chamber is deprived of oxygen, and the result is complex series of reactions of the "feedstock" to produce synthesis gas. The synthesis gas can be cleaned relatively easily, given the much lower volume of raw synthesis gas to be treated compared to the large volume of flue gases that needs to be treated in conventional post-combustion cleaning processes. In fact, gasification processes used today are already able to clean synthesis gas beyond many environmental requirements. The clean synthesis gas can subsequently be combusted in turbines or engines using higher temperature (more efficient) cycles than the conventional steam cycles associated with burning carbonaceous fuels, allowing possible efficiency improvements. Synthesis gas can also be used in fuel cells and fuel cell-based cycles with yet even higher efficiencies and exceptionally low emissions of pollutants. The (energy) efficiency of a gasification system is often measured in terms of cold gas efficiency (CGE) which is the ratio between the chemical energy in the product gas compared to the chemical energy in the fuel.

The produced synthesis gas contains carbonaceous species that are generally classified as tars, such as naphthalene, anthracene, indene, pyrene, etc. also referred to as polycyclic aromatic hydrocarbons (PAHs). These tars are very problematic due to their high viscosity and tendency to attach to any surface it comes in contact with and thereby clog piping or cause damage to other equipment. The problems associated with tar have caused a lot of concern in many gasification systems and it severely affects the operational reliability and the overall energy efficiency of the system. In particular, the risk for tar clogging is increased in those parts of the gas cleaning system where tar compounds are subjected to cooling. Cooling causes tar compounds to condensate and harden on to the surfaces. It is therefore of special importance to make sure that heat exchangers used for cooling of tar containing liquids are protected from clogging.

An obvious way to solve the problem with clogging is to reduce the gas cooling. However, this would result in a less effective gas production.

Another way to solve the problem is to add an extractant to the liquid used in the gas cleaning system.

In U.S. Pat. No. 4,154,584 there is described a method for cooling gases containing naphthalene and tar. The method comprises the steps: contacting the gas with a cooling liquid, such as water, in a direct condenser; admixing the cooling liquid with an extraction agent to extract naphthalene and tar from the cooling liquid, separating the extraction agent from the cooling liquid, and cooling the cooling liquid to the temperature required for cooling the gases in the direct condenser. The cooling liquid is then returned to the direct condenser.

However, the order of the steps presented in the method give rise to certain problems related to tar clogging. For example, the fact that the extraction agent is added to the cooling liquid directly after contact with the gases in the direct condenser, without prior cooling, results in less effective extraction and separation of tar since the high temperature of the cooling liquid promote high solubility of tar in water. To compensate for this, a large amount of extraction agent is needed. Furthermore, even though an extraction agent has been used to separate tar from the cooling liquid, there is still tar left and dissolved in the cooling liquid, in particular due to the high temperature of the cooling liquid. Hence, contrary to what is stated in U.S. Pat. No. 4,154,584, the cooling liquid is not free from tar after separation. There is therefore a risk for tar clogging in the cooling equipment used for cooling of the cooling liquid.

In US 2012/0313378 there is described a biomass gasification system, comprising: a gasification reactor and a number of scrubbing unit configured to remove tar from the producer gas. In the scrubber units a stream comprising a mixture of the removed tar and water is generated. This stream is conveyed to a contactor unit configured to contact the mixture with an organic solvent to produce a stream comprising dissolved tar, the organic solvent and the water, and a separation unit configured to remove the water from the solvent containing stream. The water may then be recirculated to a scrubber unit or a heat exchanger.

To obtain a pure gas with high energy content, effective removal of tar and water from the producer gas is a must and this may be achieved by a chilled scrubber unit, as described in US 2012/0313378. However, similar to the method in U.S. Pat. No. 4,154,584, the system in US 2012/0313378 describes a set up where an extractant is added to and removed from the scrubber water directly after contacting with the gas. The problems to separate the tar from the scrubbing water thus exists in the same way as in the method of U.S. Pat. No. 4,154,584. It is mentioned in US 2012/0313378 that one scrubbing is a chilled water scrubbing unit. Obviously, if a recirculating water stream is to be used, it must be cooled prior to contact with the gas in the chilled water scrubbing unit. US 2012/0313378 doesn't specify how this is done more than stating that the water that has been cleaned from extractant may be conveyed to a heat exchanger. It can therefore be assumed that there exists a risk of clogging in the heat exchanger during cooling of the cooling water in the same way as in the method of U.S. Pat. No. 4,154,584. Consequently, and similar to the method in U.S. Pat. No. 4,154,584, a large amount of organic solvent must be added to the mixture to guarantee sufficient removal of tar from the water to not cause clogging in subsequent parts of the system and still this is not enough to prevent the solubilized tar from dissipating as the temperature decreases during cooling.

The present inventive concept seeks to provide a gasification cleaning system and method which are more energy efficient, reliable, and cost-effective than prior art solutions.

SUMMARY

An object of the disclosure is to provide a method and a system for purifying a tar containing gas stream in order to increase the energy content of the synthesis gas and to avoid that tars attach and stick to the surfaces in a gasification system.

According to a first aspect of the inventive concept, a method for purifying a tar containing gas stream is provided. The method comprises:
a) contacting a tar containing gas stream with a washing liquid in a washing unit to obtain a tar containing washing liquid and a purified gas stream;
b) adding an extractant to the tar containing washing liquid to obtain an extraction liquid comprising a tar containing extractant and a regenerated washing liquid;
c) cooling the extraction liquid;
d) after cooling, separating the tar containing extractant from the regenerated washing liquid, and
e) recirculating the regenerated washing liquid to the washing unit.

The present invention is based on the understanding that by adding an extractant to a tar containing washing liquid before cooling and providing high residence time and contact area between the liquids, effective extraction of tar from the washing liquid is enabled at the same time as the risk of clogging in the cooling device is reduced thanks to the continuous cleaning in place. This is at least partly due to the fact that the solubility of tar in the washing liquid decreases with decreasing temperature.

Moreover, the consumption of extractant may be kept on a low level since the more the extraction liquid is cooled, the less extractant is required to remove tar from the cooling liquid.

The possibility to extract and remove tar from the washing liquid in an effective manor enables repeated use of the washing liquid in a tar purification system with reduced risk of clogging of tars onto the surfaces in the system.

The tar containing gas stream may be a synthesis gas stream obtained in a synthesis gasification process. The tar containing gas stream may be derived directly from a gasification reactor or it may have been cooled in at least one cooling unit or cleaning device before it is contacted with the washing liquid. In other words, the tar containing gas may have been conducted through a quench and/or scrubber before it enters the washing unit and is contacted with the washing liquid. The washing liquid may for example be water.

In one embodiment, the washing liquid comprises more than 80% water, such as more than 90% water, and preferably more than 95% water. Water is advantageous since it is relatively cheap, safe to handle, and environmentally friendly. Since some of the washing liquid may vaporize and escape together with the purified gas during contact with the tar containing gas stream, it is desirable that the washing liquid is cheap.

The washing liquid may have a different temperature than the tar containing gas stream. The washing liquid may for instance have a lower temperature than the tar containing gas stream in order to facilitate cooling of the tar containing gas stream. The purpose of contacting the washing liquid with the tar containing gas stream may thus be both to purify and to cool the tar containing gas stream. The washing liquid used in the method and system may therefore be referred to as a cooling liquid or a washing/cooling liquid.

When the tar containing gas stream is contacted with the washing liquid, a part of the tar is dissolved therein. In this step, some water contained in the tar containing gas stream may condense and leave the washing unit together with the tar containing washing liquid. The tar containing gas stream is thus purified in the sense that both tar and water are removed therefrom. Hence, the purpose of contacting the tar containing gas stream with the washing liquid may be described as to reduce the content of tar and water, and to raise the energy content of the gas.

The obtained tar containing washing liquid typically contains tar compounds such as phenols, mixtures of benzene, toluene, and the three xylene isomers (BTX), and naphthalene. To enable reuse of the washing liquid an extractant, i.e., a solvent, is added to the tar containing washing liquid. The extractant is preferably a liquid extractant, thereby enabling liquid-liquid extraction of the tar. The distribution of the tar between the two obtained phases (an extractant phase and a washing liquid phase) is an equilibrium condition described by partition theory. This is based on how the tar moves from the washing liquid into the extractant. The extractant is preferably less polar than the washing liquid.

In one embodiment, the extractant comprises at least one alkane selected from the group consisting of C9-C16 alkane, and preferably C10-C12 alkane. The at least one alkane may be a n-alkane and/or an iso-alkane. C9-C16 alkanes are advantageous since it offers high solubility of common tar compounds.

In one embodiment, the extractant is present in amount of 5% to 30% by weight of the extraction liquid, such as 10% to 20% by weight of the extraction liquid. The intervals allow high extraction efficiency and low operating cost.

When the tar compounds have been extracted from the washing liquid, the tar containing extractant is separated from the regenerated washing liquid. In one embodiment, step d) is performed by means of gravity or centrifugation. For this reason, it is advantageous that there is a density difference between the extractant and the washing liquid. In one embodiment, the extractant may have a density between 600-900 g/dm$^3$, such as 650-800 g/dm$^3$.

To secure an adequate extraction of the tar from the washing liquid, the type of extractant may be selected with regard to a partition coefficient of the tar. The partition coefficient is the ratio of concentrations of a compound in a mixture of two immiscible solvents at equilibrium, in other words the concentration of a specific material in a first phase divided by its concentration in a second phase. In this application, it means the concentration of tar contained in the extractant divided by the concentration of tar contained in the washing liquid. In one embodiment, the tar has a partition coefficient between 500-3000, such as 1000-2000 measured at 50° C. according to formula:

$$K = [\text{tar}]_{Extractant}/[\text{tar}]_{Regenerated\ washing\ liquid}$$

Partition coefficient may be determined by means of measuring the concentration of tar in the regenerated washing liquid and the concentration of tar in the tar containing extractant respectively, calculating the distribution quota of the tar between the regenerated washing liquid and the tar containing extractant. The measurement of the concentration of tar in the regenerated washing liquid and in the tar containing extractant, respectively, is preferably measured after step d.

The measurements are preferably made using gas chromatography or liquid chromatography.

In one embodiment, naphthalene has a partition coefficient between 500-3000, such as 1000-2000.

In one embodiment, anthracene, indene, and/or pyrene has a partition coefficient between 500-3000, such as 1000-2000.

In order to improve extraction of tars from the washing liquid, the method comprises a step of cooling the extraction liquid before the step of separating. Cooling may also be conducted during the step of separating. An effect of cooling is that the partition coefficient of tar is raised. The partition coefficient is in general temperature dependent and the solubility of tar in the washing liquid decreases with decreasing temperature of the washing liquid. Hereby, the partition coefficient increases with decreasing temperature. Adding the extractant to tar containing washing liquid before cooling is advantageous since the amount of tar clogged on to the surfaces of the cooling device may be reduced. The extractant may be added continuously to the tar containing washing liquid. Hereby continuous cleaning of the cooling device is achieved, so called continuous cleaning in place (CIP).

Although it is advantageous that the separation of tar containing extractant from the extraction liquid is hundred percent, some extractant may still remain in the regenerated washing liquid after separation. This means the regenerated washing liquid that is brought into contact with the tar containing gas may comprise some amounts of extractant. In one embodiment, the regenerated washing liquid may comprise less than 10% extractant, less than 5% extractant, and preferably less than 3% extractant when entering the washing unit.

The method may further comprise a step of:
g) mixing the extraction liquid, wherein step g) occurs during or after step c) and before step d).

In one embodiment, the method comprises a step of f) recirculating the extractant to the tar containing washing liquid, wherein step f) occurs after step d).

In a second aspect of the inventive concept, a system for purifying a tar containing gas stream is provided. The system comprises
a washing unit for contacting the tar containing gas stream with a washing liquid to obtain a tar containing washing liquid and a purified gas stream;
adding means for adding an extractant to the tar containing washing liquid to obtain an extraction liquid comprising a tar containing extractant and a regenerated washing liquid;
a pump for providing the extractant to the tar containing washing liquid during high pressure;
an extraction unit for extracting and preferably separating the tar containing extractant from the regenerated washing liquid,
a cooling unit configured to receive and cool the extraction liquid, the cooling unit being arranged upstream of the extraction unit or in the extraction unit;
a first duct for supplying the tar containing washing liquid from the washing unit to the extraction unit, and
a second duct for supplying the regenerated washing liquid back to the washing unit.

The washing unit may comprise a gas inlet, a gas outlet, a washing liquid inlet, and a washing liquid outlet. Hereby, the washing unit may comprise at least two inlets, i.e., a gas inlet for the tar containing gas stream and a washing liquid inlet for the washing liquid. In the washing unit, the tar containing gas stream is contacted with the washing liquid resulting in that some of the tar contained in the tar containing gas stream is dissolved in the washing liquid. The tar containing washing liquid exits the washing tower through a washing liquid outlet and the purified gas exits the washing unit through a gas outlet. The tar containing washing liquid that exits the washing unit typically contains tar compounds such as phenols, BTX, and naphthalene. Typically, some water contained in the tar containing gas is condensed and exits the washing unit together with the washing liquid at the washing liquid outlet.

The washing unit may be described as a washing tower. In case the washing unit has the shape of a tower, the gas inlet may be located approximate to a lower portion of the washing tower and the gas outlet may be located approximate to an upper portion of the washing tower. The washing liquid inlet may be located approximate to an upper portion of the washing tower and the washing liquid outlet may be located approximate to a lower portion of the washing tower. However, the washing unit may have another shape. In one embodiment, the washing unit is a scrubber.

The tar containing gas stream may be conveyed to the washing unit either directly from a gasification reactor or via at least one cleaning device, such as a quench and/or a scrubber.

In order to enable reuse of the washing liquid, the system comprises adding means for adding an extractant to the tar containing washing liquid thus forming an extraction liquid comprising a tar containing extractant and a regenerated washing liquid. An example of adding means is a nozzle. The adding means may be used for adding recycled extractant and/or fresh extractant.

The adding means is preferably arranged downstream the washing unit and upstream the cooling unit and the extraction unit. It is advantageous to add the extractant to the tar containing washing liquid in the first duct upstream the extraction unit in order to maximize the contact time between the extractant and the tar containing washing liquid. Hence, the efficiency of the extractant may be improved. However, the adding means may alternatively or additionally be provided in the extraction unit provided that the cooling takes place inside the extraction unit, after the extractant has been added. The extraction unit may thus comprise an inlet for the tar containing washing liquid, an inlet for extractant to be mixed with the tar containing washing liquid and/or an inlet for the extraction liquid.

To avoid clogging of the surfaces in the gas cleaning system, it is desirable to remove as much tar as possible from the tar containing washing liquid. This may be achieved by a long contact time and large contact area between the tar containing washing liquid and the extractant. The system solves this by a pump which provides the extractant to the tar containing washing liquid in the first duct during high pressure. The pump causes a large contact area between extractant and washing liquid due to the high turbulence in the liquids.

To further improve the mixing of the tar containing washing liquid and the extractant, the system may comprise a mixer for mixing the tar containing washing liquid with the extractant, the mixer being provided upstream of the cooling unit. Similar to the pump, the mixer provides turbulence between the extractant and the tar containing washing liquid which increases the contact area between the two of them.

The location of the mixer upstream the cooling unit increases the contact area between the tar containing washing liquid and extractant before entering the cooling unit. An effect of this is that the amount of tar clogged on the surface of the cooling unit may be reduced. The mixer may be static, i.e., it may consist of removable plates provided inside a duct arranged in a way to improve turbulent flow and thus mixing of fluids.

The system may comprise a pump located downstream of the adding means, the pump being configured to cause turbulence in the extraction liquid in the first duct.

In order to improve extraction of tar from the washing liquid, the extraction liquid is cooled before entering the extraction unit and/or in the extraction unit. The system thus comprises a cooling unit adapted to cool the extraction liquid. The cooling unit may be arranged upstream the extraction unit or in the extraction unit. The cooling unit is arranged downstream of the adding means. Hereby, the tar containing washing liquid pass the cooling unit together, and mixed, with the extractant. An effect of this is that the cooling unit is prevented from clogging of tar from the tar containing washing liquid and continuous cleaning in place is achieved.

An example of a cooling unit is a cooling heat exchanger. The cooling unit may for example be a plate heat exchanger. An effect of the plate heat exchanger is that turbulence is facilitated. However, it may be difficult to clean a plate heat exchanger that has been clogged. For this reason, the continuous addition of extractant as mentioned before is an advantage.

In the extraction unit, the tar compounds are extracted from the washing liquid. In one embodiment, the extraction unit may comprise an integrated separation unit. Examples of separation unit are sedimentation tank and sedimentation vessel.

The extraction unit may comprise an inlet for the tar containing washing liquid, an outlet for the tar containing extractant, and an outlet for the regenerated washing liquid. The outlet for the regenerated washing liquid and the tar containing extractant may be provided at different heights of the extraction unit. Hereby, the difference in density between the regenerated washing liquid and the tar containing extractant is utilized. However, the outlet for the tar containing extractant and the outlet for the regenerated washing liquid may be provided at the same height. The outlet for the tar containing extractant and the outlet for the regenerated washing liquid may be the same.

In one embodiment, the system may comprise a separation unit adapted to separate the tar containing extractant from the regenerated washing liquid. The system may thus comprise a separation unit which is not a part of the extraction unit. The separation unit is preferably arranged downstream the extraction unit. The separation unit may be a centrifuge.

BRIEF DESCRIPTION OF THE DRAWINGS

The disclosure will be described in more detail with reference to the appended schematic drawings, which show an example of a presently preferred embodiment of the disclosure.

DETAILED DESCRIPTION

Figure 1:
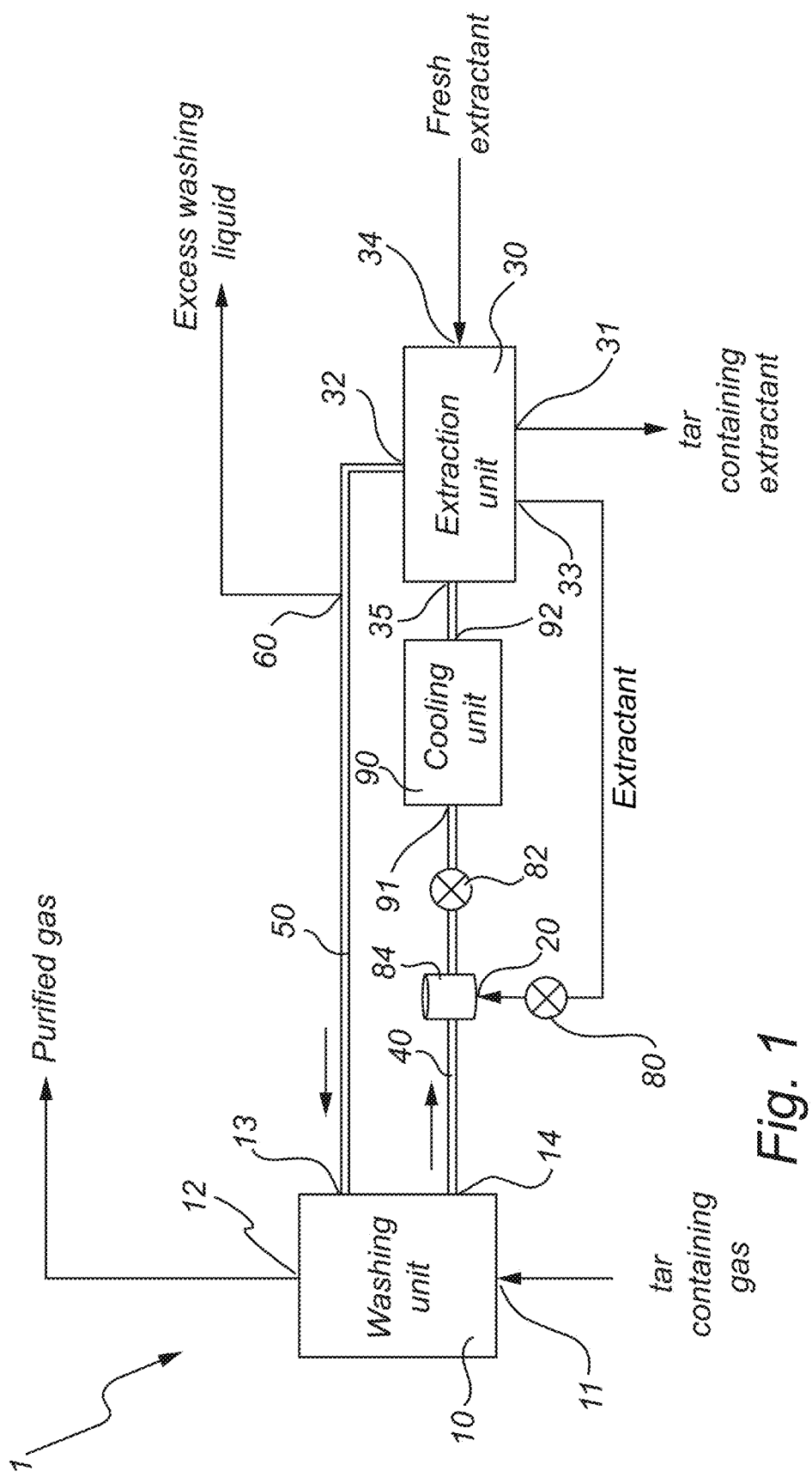
FIG. 1 illustrates a system for purifying a tar containing gas stream according to at least one example embodiment of the inventive concept.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

FIG. 1 shows a system 1 for purifying a tar containing gas stream. The system 1 comprises a washing unit 10, e.g. scrubber, configured to contact a tar containing gas stream to a washing liquid. The washing unit 10 comprises a gas inlet 11 for a tar containing gas stream and a washing liquid inlet 13 for a tar containing washing liquid. The tar containing gas stream may be conducted to the washing unit 10 directly from a gasification reactor or via at least one cleaning device, such as a quench or a scrubber. The contacting results in that some of the tars contained in the tar containing gas stream is dissolved in the washing liquid generating a tar containing washing liquid. The gas inlet 11 may be located in a lower part of the washing unit 10 and the washing liquid inlet 13 may be located in an upper part of the washing unit 10.

The purified gas exits the washing unit 10 through a gas outlet 12. The tar containing washing liquid exits the washing unit 10 through a washing liquid outlet 14 and is conveyed via a first duct 40 to an extraction unit 30. The tar containing washing liquid typically contains, in addition to tar compounds, water that has condensed in the washing unit 10. The gas outlet 12 may be located approximate to an upper portion of the washing unit 10 and the washing liquid outlet 14 may be located approximate to a lower portion of the washing unit 10.

In order to enable reuse of the washing liquid, the system 1 comprises adding means 20, 34, e.g. nozzle, for adding an extractant to the tar containing washing liquid. An extraction liquid comprising a tar containing extractant and a regenerated washing liquid are thereby generated. The adding means 20 is arranged downstream the washing unit 10 and upstream the extraction unit 30. Extractant is thus added to the washing liquid before it enters the extraction unit 30. This is beneficial for extraction efficiency in the extraction unit 30 since it is advantageous to have long contact time between the tar containing washing liquid and the extractant.

To further improve the extraction efficiency in the extraction unit 30, a cooling unit 90 adapted to cool the extraction liquid is arranged downstream the washing unit 10 and upstream the extraction unit 30. The cooling unit 90 also has the benefit of enabling that the washing unit 10 provides cooling of the gas stream. Such cooling is generally desirable as the synthesis gas is hot when it exits the gasifier and it generally needs to be cooled before it is used in downstream applications. The cooling unit 90 has an extraction liquid inlet 91 for hot extraction liquid and an extraction liquid outlet 92 for the cooled extraction liquid. A cooling unit 90 may also be arranged in the extraction unit 30 (not illustrated in FIG. 1).

A pump 80 is arranged in connection to the adding means 20 in order to provide the extractant to the tar containing washing liquid during high pressure, enabling adequate mixing between the extractant and the tar containing washing liquid.

To further improve the mixing of the tar containing washing liquid and the extractant, the system may comprise a mixer 84 for mixing the tar containing washing liquid with the extractant. The mixer is provided upstream of the cooling unit 90. The location of the mixer upstream the cooling unit 90 increases the contact area between the tar containing washing liquid and extractant before entering the cooling unit 90. An effect of this is that the amount of tar clogged on the surface of the cooling unit 90 may be reduced. The mixer may be static, i.e., it may consist of removable plates provided inside the first duct 40, and be arranged in a way to improve turbulent flow and thus mixing of fluids.

The system may comprise a pump 82 located downstream of the adding means 20 and, if a mixer is provided, downstream of the mixer. The pump 82 is configured to cause turbulence in the extraction liquid in the first duct 40.

Mixing is hereby provided in the duct 40, after addition of extractant to the tar containing washing liquid, and in the extraction unit 30. In particular, mixing is provided in an entrance region, near inlet 35 of the extraction unit 30, where the liquids tend to be more turbulent. Mixing is important for the separation of tar from the tar containing washing liquid.

In addition to the adding means 20 provided upstream of the extraction unit, the extraction unit 30 itself may comprise adding means 34, i.e., an inlet for extractant, such as fresh extractant. Hereby, extractant may be added to the tar containing washing liquid before and/or in the extraction unit 30. Hereby, the extraction unit 30 may comprise an inlet for tar containing washing liquid, an inlet for extractant and/or an inlet for extraction liquid. It should be noted that this inlet may be the same for all liquids.

In the extraction unit 30, the tar compounds are extracted and separated from the regenerated washing liquid. The extraction unit 30 comprises an outlet 31 for tar containing extractant bleed-off and an outlet 32 for regenerated washing liquid. The extraction unit 30 may also comprise an outlet 33 for tar containing extractant that is recirculated to the adding means 20. It should be noted that the outlet 33 for the tar containing extractant may also be used as an outlet for tar containing extractant bleed-off. Vice versa may the outlet for the tar containing extractant bleed-off 31 be used as an outlet for tar containing extractant.

A second duct 50 leads the regenerated washing liquid back to the washing unit 10. Excess washing liquid may be removed at a duct 60 before the washing liquid is conveyed to the washing unit 10.

Figure 2:
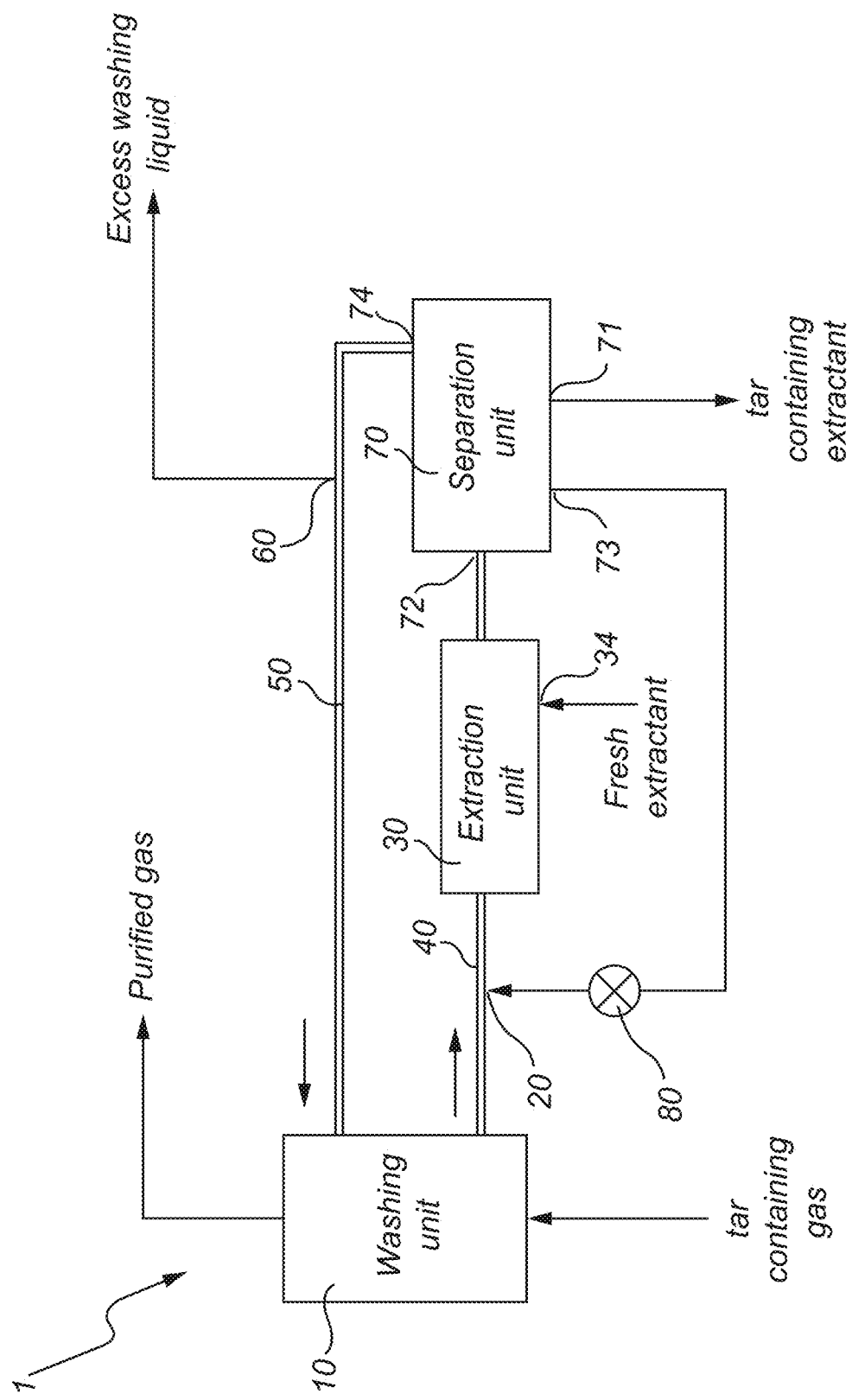
FIG. 2 illustrates a system for purifying a tar containing gas stream according to at least one example embodiment of the inventive concept.
Figure 3:
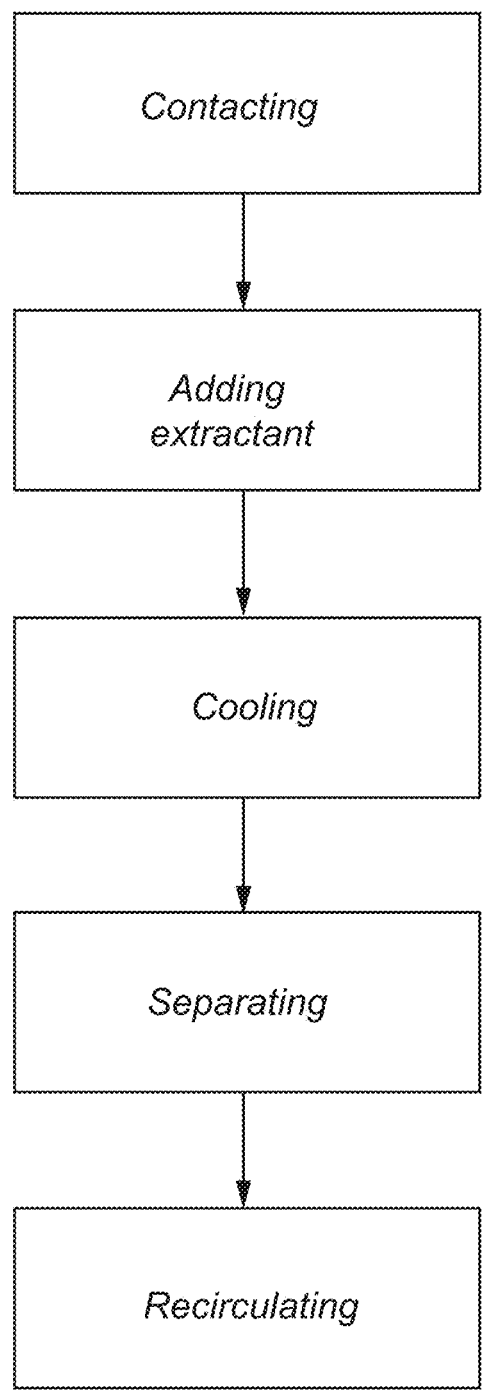
FIG. 3 illustrates a flow chart for a method for purifying a tar containing gas stream, according to at least one example embodiment of the inventive concept.

FIG. 2 shows a system 1 for purifying a tar containing gas stream. The system 1 comprises the same features as illustrated in FIG. 1 (although the cooling unit is not shown in FIG. 2), with the exception of the extraction unit 30 and a separation unit 70. In contrast to the extraction unit in FIG. 1, the extraction unit 30 in FIG. 3 is configured solely for mixing and not for separation. Hence, in this system, the extraction unit 30 serves to mix the extractant with the washing liquid while the separation takes place in a specific separation unit 70 located downstream of the extraction unit. The separation unit 70 may be a centrifuge or a sedimentation tank. The separation unit 70 comprises an extraction liquid inlet 72 and a regenerated washing liquid outlet 74. The separation unit 70 further comprises an outlet 71 for tar containing extractant bleed-off and an outlet 73 for tar containing extractant that is allowed to be recirculated to the adding means 20 for reuse as extractant. Outlets 71 and 73 may be the same outlet.

FIG. 3 illustrates a method for purifying a tar containing gas stream. In a first step, a tar containing gas stream derived directly from a gasification reactor, or via one or more cleanings devices such as quench, is contacted with a washing liquid, such as water, in a washing unit. The washing liquid may typically have a lower temperature than the tar containing gas stream.

When the tar containing gas is contacted with the washing liquid, a portion of the tar contained in the tar containing gas stream is dissolved in the washing liquid and a tar containing washing liquid is generated. Typically, also some water contained in the tar containing gas is condensed and leaves the washing unit together with the tar containing washing liquid. The tar containing gas stream is thus purified in the sense that both tars and water have been removed therefrom. Hence, a purified gas with increased energy value is obtained.

The tar containing washing liquid typically contains tar compounds such as phenols, BTX, and naphthalene. These compounds tend to stick to surfaces and clog pipes. In order to enable recirculation of the washing liquid, an extractant is added to the tar containing washing liquid. An extractant liquid comprising a tar containing extractant and a regenerated washing liquid is thus obtained. As an example, the extractant may comprise alkanes, such as C9-C16 alkanes. C9-C16 alkanes are advantageous in that the solubility of common tar compounds is high. The extractant may be added in an amount such that the concentration of the extractant in the extraction liquid is between 5-30%, and preferably 10-20%.

After extractant is added to the tar containing washing liquid the extraction liquid is cooled. Cooling of the extraction liquid may improve the extraction of tar from the washing liquid.

It should be noted that in order to secure adequate extraction of the tar from the extraction liquid, the type of extractant may be selected with regards to its partition coefficient. The partition coefficient is the relation of the concentration of tar contained in the extractant and the concentration of tar contained in the washing liquid and is dependent on temperature. As an example, the partition coefficient of the tar may be between 500-3000, such as 1000-2000.

The temperature dependency of the partition coefficient has to do with the fact that the solubility of tar in the washing liquid decreases with decreasing temperature. Hereby, the partition coefficient increases with decreasing temperature. In order to improve extraction of tar from the washing liquid and thus raise the partition coefficient, the extraction liquid is cooled before it enters the extraction unit and optionally in the extraction unit.

The extraction liquid may be subjected multiple steps of cooling. For instance, the extraction liquid may be subjected to a first cooling step before it enters the extraction unit and a second cooling step in the extraction unit.

After the tar compounds have been extracted from the tar containing washing liquid, tar containing extractant is separated from the regenerated washing liquid. The tar containing extractant may be separated from the regenerated washing liquid by means of gravity or centrifugation. For this purpose, it is advantageous that there is a density difference between the extractant and the washing liquid. As an example, the extractant may have a density between 600-900 g/dm$^3$, such as 650-800 g/dm$^3$. Other criteria taking into to account when choosing extractant are viscosity and vapor pressure. Viscosity is important to secure flow and vapor pressure is important in order to secure safety aspects.

It should be noted that in the step of separation, some of the extractant may be left in the regenerated the washing liquid and thus follow the regenerated washing liquid back to the washing unit. However, it is preferable that as much as possible of the tar containing extractant is separated since there is a risk that the extractant is vaporized in the washing unit and exits together with the purified gas, resulting in unwanted loss of extractant which is costly.

The generated washing liquid is then recirculated to the washing unit. Before recirculation, some of the washing liquid may be removed from the system in order to balance excess water that has condensed during the step of contacting.

The skilled person realizes that a number of modifications of the embodiments described herein are possible without departing from the scope of the disclosure, which is defined in the appended claims.

The invention claimed is:

1. A method for purifying a tar containing gas stream, the method comprising the steps of:
   a) contacting a tar containing gas stream with a washing liquid in a washing unit to obtain a tar containing washing liquid and a purified gas stream;
   b) adding an extractant to the tar containing washing liquid to obtain an extraction liquid comprising a tar containing extractant and a regenerated washing liquid;
   c) cooling the extraction liquid using a plate heat exchanger;
   d) after cooling, separating the tar containing extractant from the regenerated washing liquid, and
   e) recirculating the regenerated washing liquid to the washing unit.

2. The method according to claim 1, wherein the extractant comprises at least one alkane selected from the group consisting of C9-C16 alkane.

3. The method according to claim 1, wherein the extractant is added continuously to the tar containing washing liquid.

4. The method according to claim 1, wherein the extractant is present in amount of 5% to 30% by weight of the extraction liquid.

5. The method according to claim 1, wherein the tar has a partition coefficient between 500-3000 measured at 50° C. according to formula:

$$K = [\text{tar}]_{Extractant}/[\text{tar}]_{Regenerated\ washing\ liquid}.$$

6. The method according to claim 1, wherein the washing liquid comprises more than 80% water.

7. The method according to claim 1, wherein the extractant has a density between 600-900 g/dm$^3$.

8. The method according to claim 1, wherein the step d) is performed by means of centrifugation or by means of gravity.

9. The method according to claim 1, further comprising a step of:
   f) recirculating the tar containing extractant to the tar containing washing liquid, wherein step f) occurs after step d).

10. The method according to claim 1, further comprising a step of:
    g) mixing the extraction liquid, wherein step g) occurs during or after step b) and before step c).

11. A system (1) for purifying a tar containing gas stream, the system comprising:
    a washing unit (10) for contacting the tar containing gas stream with a washing liquid to obtain a tar containing washing liquid and a purified gas stream;
    adding means (20, 34) for adding an extractant to the tar containing washing liquid to obtain an extraction liquid comprising a tar containing extractant and a regenerated washing liquid;
    a pump (80) for providing the extractant to the tar containing washing liquid during high pressure;
    an extraction unit (30) for extracting and preferably separating the tar containing extractant from the regenerated washing liquid,
    a cooling unit (90), being a plate heat exchanger configured to receive and cool the extraction liquid, the cooling unit being arranged upstream of the extraction unit (30) or in the extraction unit (30)
    a first duct (40) for supplying the tar containing washing liquid from the washing unit (10) to the extraction unit (30), and
    a second duct (50) for supplying the regenerated washing liquid from the extraction unit (30) back to the washing unit (10),
    wherein the adding means (20) are arranged downstream the washing unit (10) and upstream the cooling unit (90) to add the extractant to the tar containing washing liquid in the first duct (40), and/or in the extraction unit (30).

12. The system according to claim 11, further comprising a separation unit (70) adapted to separate the tar containing extractant from the regenerated washing liquid.

13. The system according to claim 11, further comprising a mixer (84) for mixing the tar containing washing liquid with the extractant, the mixer being provided upstream of the cooling unit (90).

14. The system according to claim 11, further comprising a pump (82) located downstream of the adding means (20, 34), the pump being configured to cause turbulence in the extraction liquid in the first duct (40).

15. The method according to claim 1, wherein the extractant comprises at least one alkane selected from the group consisting of C10-C12 alkane.

16. The method according to claim 1, wherein the extractant is present in amount of 10% to 20% by weight of the extraction liquid.

17. The method according to claim 1, wherein the tar has a partition coefficient between 1000-2000 measured at 50° C. according to formula:

$$K = [\text{tar}]_{Extractant}/[\text{tar}]_{Regenerated\ washing\ liquid}.$$

18. The method according to claim 1, wherein the washing liquid comprises more than 90% water.

19. The method according to claim 1, wherein the washing liquid comprises more than 95% water.

20. The method according to claim 1, wherein the extractant has a density between 650-800 $g/dm^3$.

* * * * *